US007959967B2

(12) United States Patent
Pattenden

(10) Patent No.: US 7,959,967 B2
(45) Date of Patent: Jun. 14, 2011

(54) TOOL TO PIERCE AND SPLIT A COCONUT

(76) Inventor: John Maurice Pattenden, Mystic, CT (US)

( * ) Notice: Subject to any disclaimer, the term of this patent is extended or adjusted under 35 U.S.C. 154(b) by 325 days.

(21) Appl. No.: 12/271,882

(22) Filed: Nov. 15, 2008

(65) Prior Publication Data

US 2010/0124595 A1 May 20, 2010

(51) Int. Cl.
*A23N 5/03* (2006.01)

(52) U.S. Cl. ........ 426/617; 426/482; 426/489; 426/518; 99/506; 99/509; 99/568; 99/582

(58) Field of Classification Search .................. 426/617, 426/478, 479, 481–482, 489, 518; 99/495, 99/501, 502, 504, 505, 506, 509, 537, 567, 99/568, 582
See application file for complete search history.

(56) References Cited

U.S. PATENT DOCUMENTS

| | | | | | |
|---|---|---|---|---|---|
| 1,367,809 | A | * | 2/1921 | Fons | 99/587 |
| 1,475,459 | A | * | 11/1923 | Tenney et al. | 99/587 |
| 1,506,571 | A | * | 8/1924 | Deremberg | 99/495 |
| 1,577,953 | A | * | 3/1926 | Carter | 99/582 |
| 2,373,584 | A | * | 4/1945 | Malicay | 99/509 |
| 2,546,446 | A | * | 3/1951 | Harbison | 524/495 |
| 2,739,630 | A | * | 3/1956 | Rey | 83/458 |
| 3,191,651 | A | * | 6/1965 | Sindel | 426/481 |
| 3,894,810 | A | * | 7/1975 | Palis | 426/482 |
| 4,145,962 | A | * | 3/1979 | Coleman et al. | 99/572 |
| 4,350,088 | A | * | 9/1982 | Rubio, Jr. | 99/538 |
| 4,383,479 | A | * | 5/1983 | Hill | 99/572 |
| 5,267,698 | A | * | 12/1993 | Pettit | 241/168 |
| 6,041,697 | A | * | 3/2000 | Maoz | 99/572 |

FOREIGN PATENT DOCUMENTS

| | | | |
|---|---|---|---|
| DE | 19853804 A1 | * | 5/2000 |
| IN | 200100009 I2 | * | 7/2005 |

* cited by examiner

*Primary Examiner* — Drew E Becker

(57) ABSTRACT

One embodiment of a tool to pierce and split a coconut to facilitate removal of the water and meat from the nut. The tool includes of a body (100), comprising a frame (110) sufficient in size to accommodate a coconut and a constrictor cup (124), a shaft (210) which has releasably engaged tap assembly (300) and a releasably engaged splitter assembly (400). The body has a hub aperture (160) to receive the shaft (210). The shaft has means to urge both the cutting and the splitting end into coconut. Other embodiments are described and shown.

20 Claims, 10 Drawing Sheets

TOOL TO PIERCE AND SPLIT A COCONUT

CROSS-REFERENCE TO RELATED APPLICATIONS

This application claims the benefits of PPA Ser. No. 60/991,340 filed Nov. 30, 2007 by the present inventor, which is incorporated by reference.

FEDERALLY SPONSORED RESEARCH

Not applicable

SEQUENCE LISTING OR PROGRAM

Not applicable

BACKGROUND OF THE INVENTION

1. Field of the Invention

This invention generally relates to kitchenware, specifically to opening coconuts.

2. Description of Related Art

A coconut consists of water at the very center which is surrounded by meat, or endosperm, a thin brown cuticle, or testa, a hard brown shell, or endocarp, and an outer husk. The outer husk is usually removed before the coconut is sold for cooking.

Throughout time the opening of coconuts has been a somewhat difficult and hazardous undertaking. Although there is no set formula, the traditional approach has involved the use of a range of dangerous tools including machete, cleaver, cutlass, hatchet, knife, hammer, nails and ice pick. To the novice, the use of any of these tools can be hazardous and lead to both personal injury and damage to property. The task is not made any easier by the ungainly shape of the coconut. One approach to making the opening of the nut easier is to heat it first. However, this practice is not ideal since it drives off some of the essential oils in the meat and also makes the meat more liable to become rancid.

Several solutions to opening the nut and the husk have been proposed but most are for commercial use and involve large, expensive machinery. There therefore exists the need for a safer tool to perform the hazardous task of procuring the water and meat from a coconut in the kitchen, and, one that is inexpensive to produce and compact in size. The only apparatus known to the applicant that can perform the cutting function in a kitchen is U.S. Pat. No. 4,350,088 to Rubio (1982). However, this appliance has a number of drawbacks, mainly emanating from the fact that it is electrically powered. This adds to the size and cost. It also requires repeated opening of the cover to start and stop the electric motor to facilitate the tightening of the cutters against the coconut until the nut is completely cut in half. A further shortcoming of Rubio's device is that he does not provide for the removal of the valuable coconut water prior to cutting.

With respect to the piercing of the coconut, in order to drain off the water, the applicant considered U.S. Pat. No. 1,277,308 to Gunturiz (1918) but found it suffered from the usual drawbacks from hammering into the ungainly shaped nut. Namely, the potential of the hammering leading to injury, and or, smashing the nut thereby possibly contaminating the water and meat. U.S. Pat. No. 5,119,559 to Sanabria (1992) is designed to puncture through the husk and the nut in order to gain access to the water. There are two issues with this invention. Firstly, with this invention, the husk is still on and this implies the nut is young and not well developed. As the coconut matures the nut becomes harder and can only be penetrated through the softer eyes after dehusking. Secondly, it has a sharp blade and the invention does not address the issue of supporting the ungainly shaped nut while attacking it with this potentially dangerous tool. Another related piece of art is the Australian device known as the CocoTap AU Pat. 2004101090 to Paul Douglas Richardson (2005). This device suffers from the same two issues as the Sanabria invention.

BRIEF SUMMARY OF THE INVENTION

In accordance with one embodiment, a tool to reduce the hazardous nature of piercing and splitting the ungainly shaped coconut in order to gain access to its water and meat.

DRAWINGS

Reference Numerals

| | | | |
|---|---|---|---|
| 100 | Body | 110 | Frame |
| 120 | Base plate | 124 | Constrictor cup |
| 125 | Fossa | 126 | Spikes |
| 140 | Hub | 160 | Hub aperture |
| 165 | Frame aperture | 170 | Grip |
| 180 | Channel | 200 | Drive assembly |
| 210 | Shaft | 220 | Handle |
| 230 | Aperture | 240 | Securing apertures |
| 250 | Hollow | 300 | Tap assembly |
| 310 | Barrel | 320 | Lugs |
| 350 | Sharp edge | 360 | Inspection port |
| 400 | Splitter assembly | 410 | Shank |
| 420 | Chisel | 440 | Ball |
| 450 | Socket | 460 | Swivel joint |
| 470 | Concave blade | 500 | Shield |
| 510 | Latch | 550 | Clamp assembly |
| 552 | Upper flange | 554 | Middle flange |
| 556 | Lower flange | 558 | Threaded aperture |
| 560 | Clamping device | 562 | Clamp handle |
| 564 | Threaded shaft | 566 | Swivel plate |
| 610 | Flared head | 700 | Gear Assembly |
| 710 | Spur gear | 720 | Screw pinion |
| 730 | Lever | | |

DETAILED DESCRIPTION

First Embodiment—FIGS. 1, 2, 3, 4, 5, and 6

Figure 1:
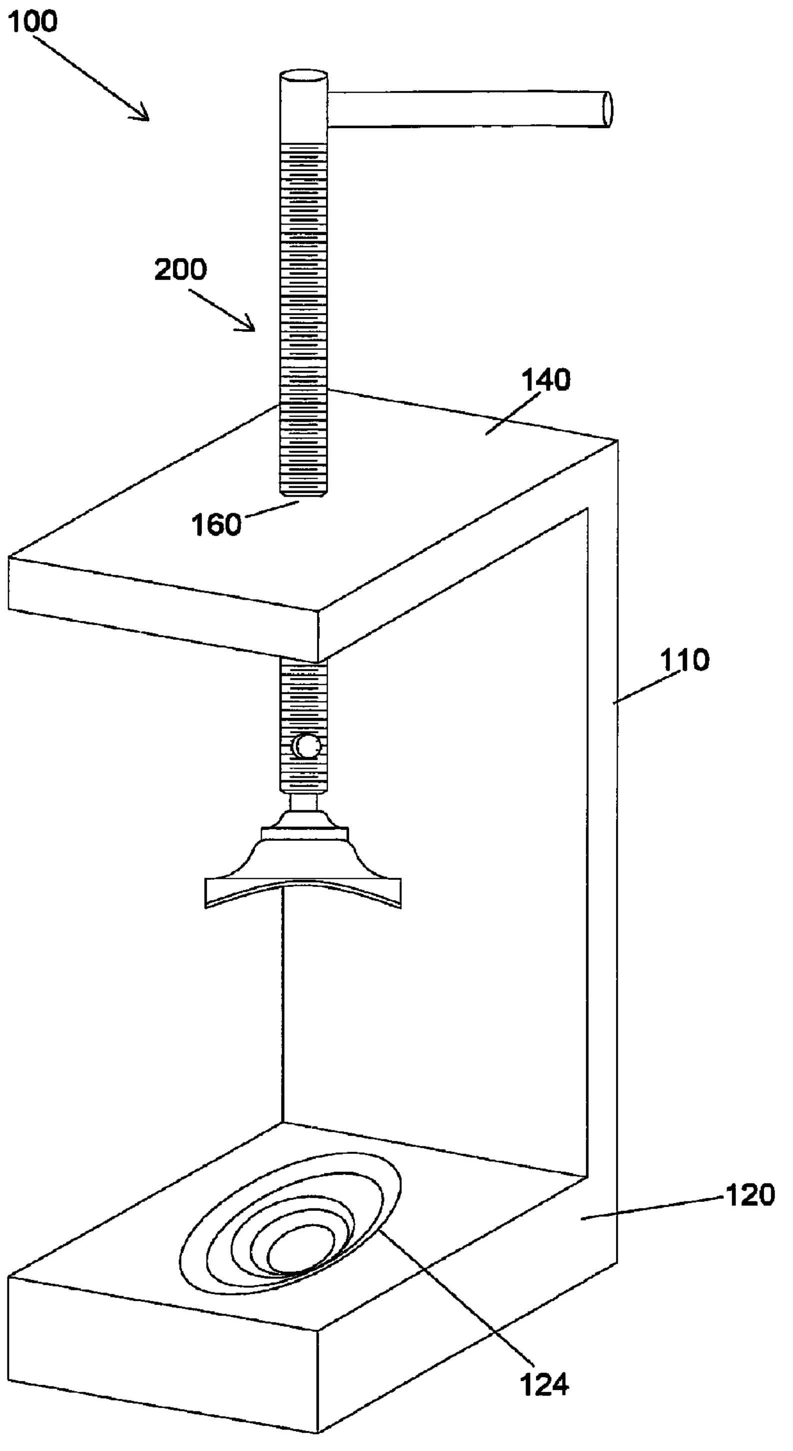
FIG. 1 is a perspective view of a first embodiment of my invention.

FIG. 1 shows a perspective view of one embodiment of my coconut opening tool. The tool has a body 100 comprising of an anvil or base plate 120, a frame 110, and a hub 140. I presently contemplate that the body of this embodiment is made from stainless steel and is fashioned as a solid "C" or "G" shape. However, the body can have different shapes, for example a hollowed square, and be constructed of different suitable materials such as, but not limited to, other steels, plastic, wood etc.

Figure 2A:
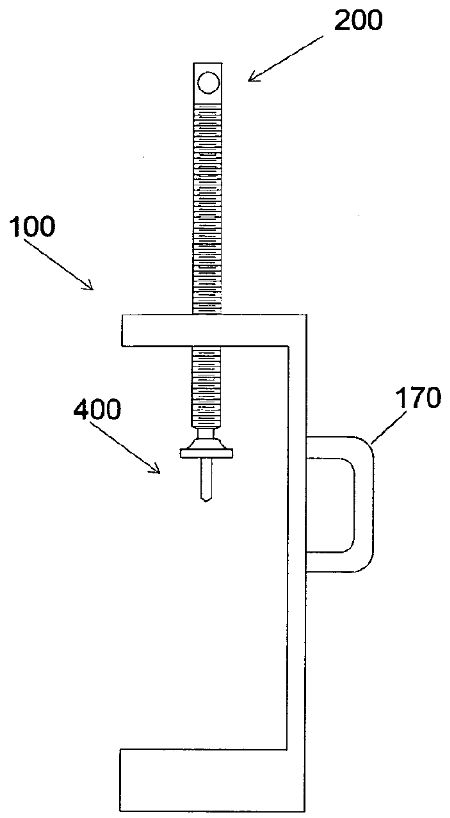
FIGS. 2A to 2D shows various aspects of the first embodiment.
Figure 2B:
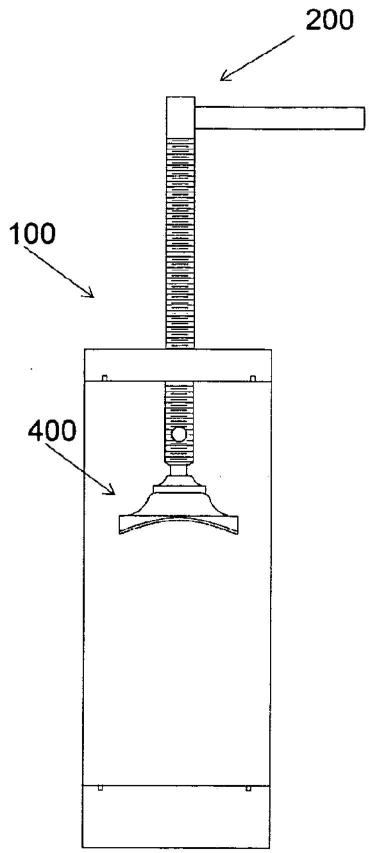
Figure 2C:
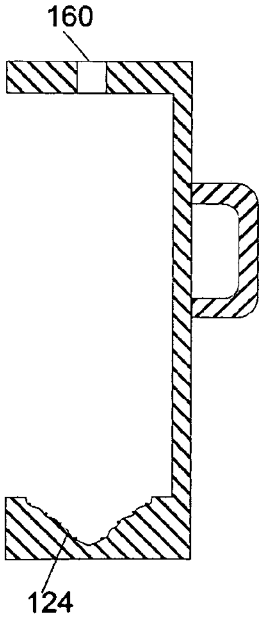
Figure 2D:
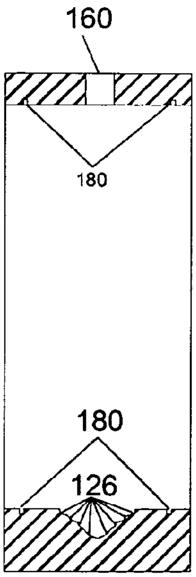
Figure 3:
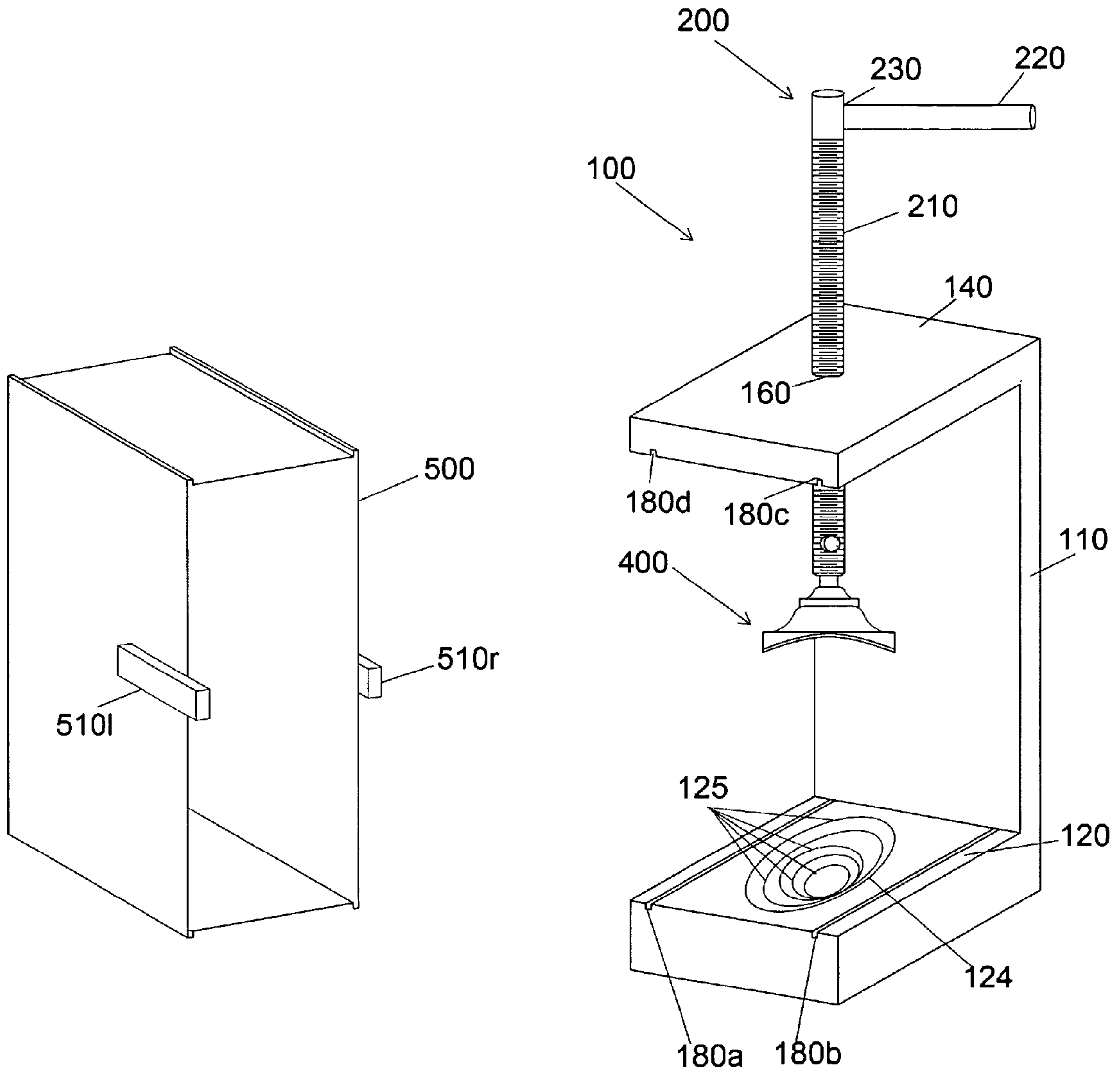
FIG. 3 is a perspective view of the tool with a shield

The base plate 120 is substantially horizontal and sits in the lower portion of the body 100. The upper side of the base plate 120 has a constrictor cup 124 (FIG. 2C) fashioned into it by having a series of fossae 125 (FIG. 3) carved out of it. The fossae 125 are elliptical in shape and of decreasing size and increasing depth as their foci get closer together. The fossae 125 nearest the center have foci so close together they are substantially circular. The depressions that these fossae create are designed to approximate the shape of a coconut and are intended to secure the nut from moving off the base plate 120. The gradual reduction in the fossae sizes is to facilitate coconuts of varying sizes. The constrictor cup 124 may, or may not, have its surface finished with a plurality of threads, spurs or spikes 126 (FIG. 2D). The hub 140 is substantially horizontal and sits on the upper portion of the body 100, above the base plate 120. There is a hub aperture 160 in the hub 140 to accommodate a drive assembly 200. The hub aperture 160 is threaded in this embodiment but does not have to be in all variations of this invention. The frame 110 has a grip 170 built into it. In this embodiment the grip 170 is a handle (FIG. 2A). However, the grip could take many forms including, but not limited to, a bar with inset space for fingers, the upright of frame 110 fashioned to be gripped in the palm etc. The frame 110 has a plurality of channels 180 to receive a shield 500 (FIG. 3).

The drive assembly 200 consists of a shaft 210, a handle 220, and an interchangeable tap assembly 300 or an interchangeable splitter assembly 400. The shaft 210 is threaded in this embodiment but does not have to be in all variations of this invention. The shaft 210 has an aperture 230 near one end to accommodate the handle 220. The other end of the shaft 210 is hollow 250 and contains two securing apertures 240 ready to receive said interchangeable tap assembly 300 or said interchangeable splitter 400.

Figures 4A, 4B, 4C, 4D:
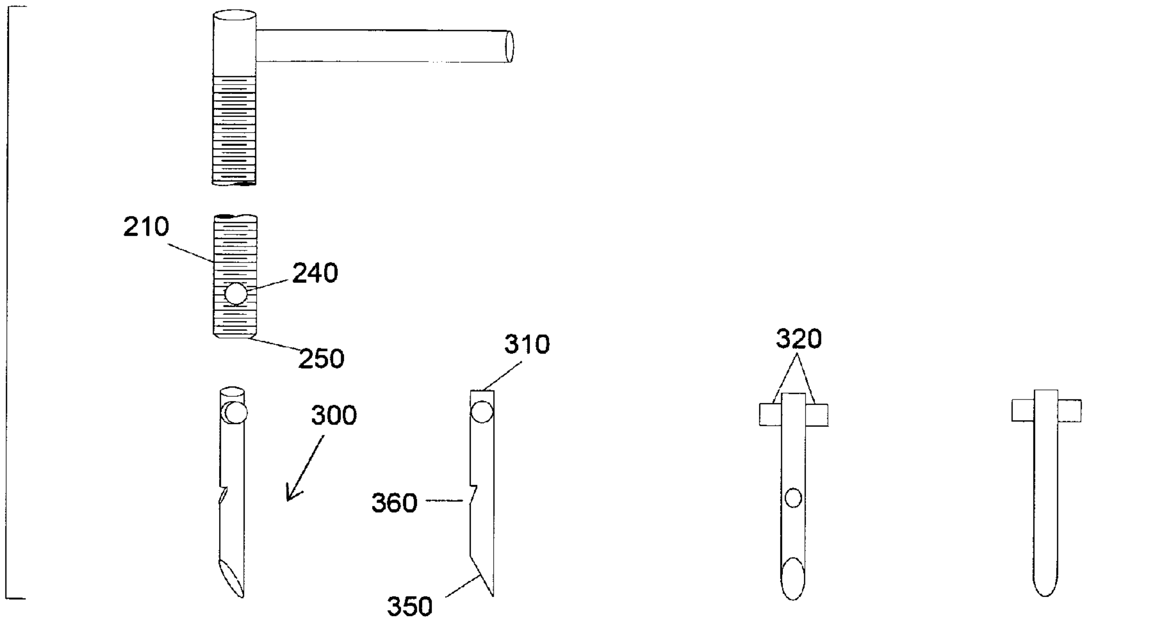
FIGS. 4A to 4D shows various aspects of a tap

The tap assembly 300 consists of a hollow barrel 310 which has a diagonal sharp edge 350 at its base (FIG. 4B) and an inspection port 360 on the side of the barrel. The diameter of the barrel 310 is such that it will slide inside the hollow 250 end of the shaft 210 (FIG. 4A). Near the top of the barrel 310 are two lugs 320 (FIG. 4C) that are spring loaded and ready to lock into the securing apertures 240 of the shaft 210. I presently contemplate that the tap assembly 300 in this embodiment will be as described above and made of stainless steel. However, it could be manufactured from other suitable materials including, but not limited to, plastics, wood, other steels etc. Also, the tap assembly 300 could be solid, more like an ice pike or like a cork screw or any other suitable piercing design.

Figure 5A:
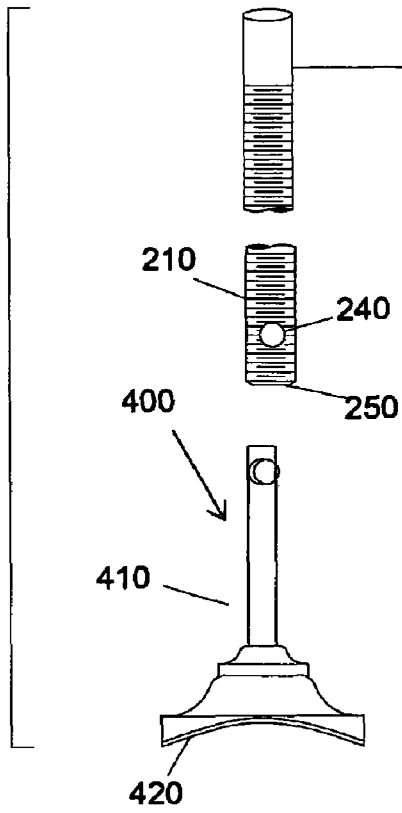
FIGS. 5A to 5G shows various aspects of a splitter
Figure 5B:
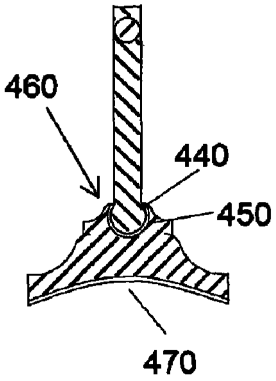
Figure 5C:
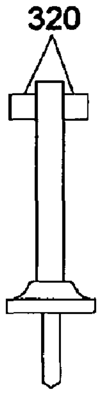
Figure 5D:
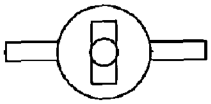
Figure 5E:
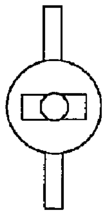
Figure 5F:
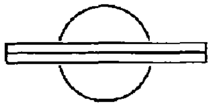
Figure 5G:
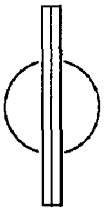

The splitter assembly 400 consists of a shank 410 and a chisel 420 (FIG. 5A). The diameter of the shank 410 is such that it will slide inside the hollow 250 end of the shaft 210. One end of the shank 410 has two lugs 320 that are spring loaded and ready to lock into the securing apertures 240 of the shaft 210. The other end of the shank 410 is shaped into a ball 440. The chisel 420 has a socket 450 formed in it to accommodate the ball 440 of the shank 410. The combination of the ball 440 and the socket 450 create a swivel joint 460 (FIG. 5B). The chisel 420 has a concave blade 470. The shape of the concave blade 470 is designed to approximate the curvature of the side of a coconut. I presently contemplate that the splitter assembly 400 in this embodiment will be as described above and made of stainless steel. However, it could manufactured from other suitable materials including, but not limited to, plastics, wood, other steels etc. Also, the chisel 420 could be fashioned in other ways, for example the blade could be made from varying degrees of curvature or it might be flat not concave.

The shield 500 is shaped to fit snug into the frame 110 (FIG. 3). In this embodiment it would slide into a slots or the channels 180 and be secured with some form of a latch 510 to the frame 110. The shield 500 may, or may not, be molded to keep the coconut more secure on the base plate 120. The shield 500 in this embodiment is made of transparent plastic but it could be made from any suitable materials like, but not limited to, stainless steel mesh.

Figure 6:
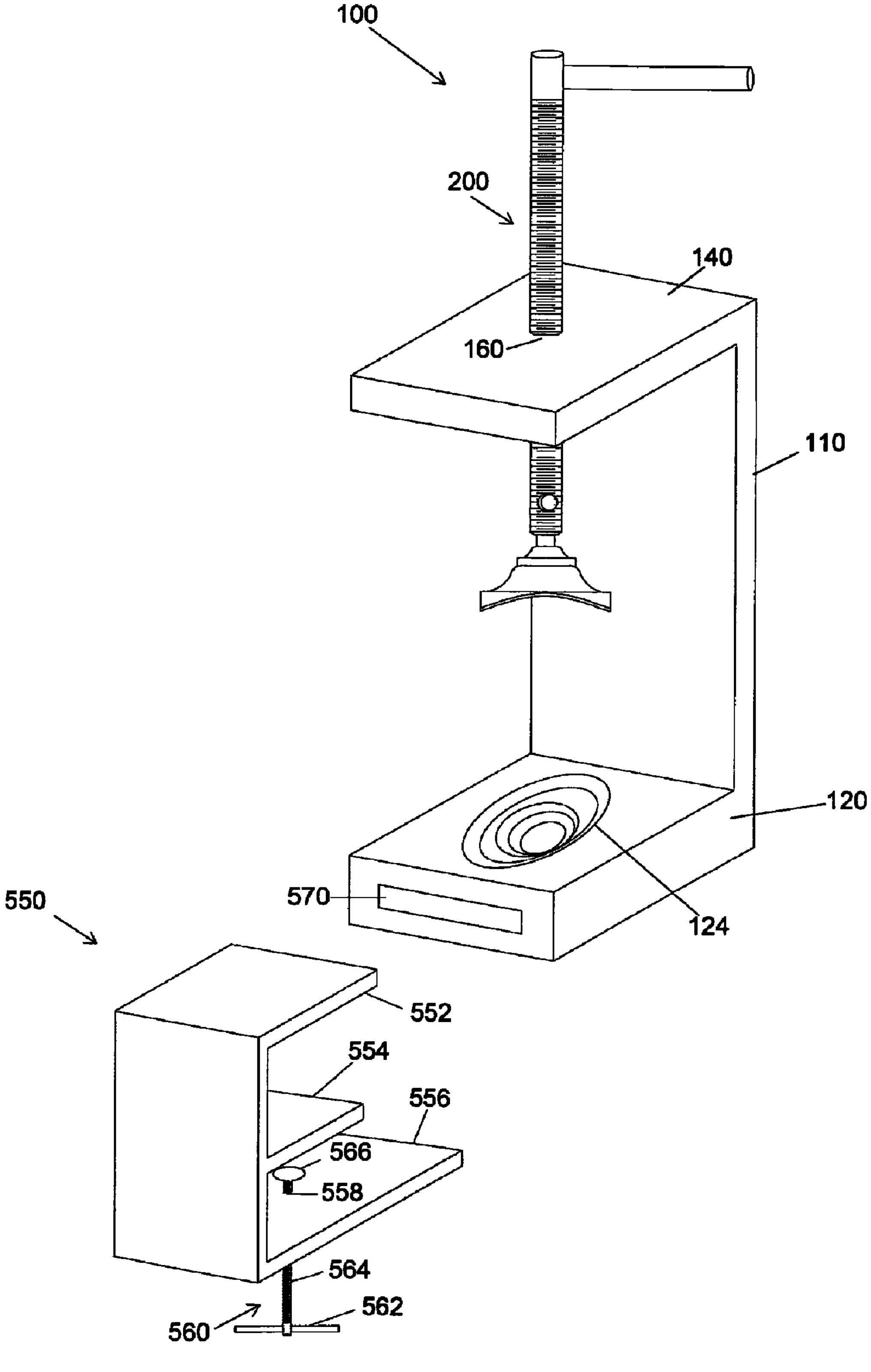
FIG. 6 is a perspective view of a clamp

A further enhancement to this tool is the provision of a clamp to provide means to secure said tool to a kitchen top, table or other similar stationary flat work surface. One embodiment of this enhancement could be the clamp assembly 550 consists of a frame with an upper flange 552, a middle flange 554, a lower flange 556 and a clamping device 560 (FIG. 6). The lower flange 556 has a threaded aperture 558 to receive said clamping device 560. The clamping device 560 consists of a clamp handle 562, a threaded shaft 564 and a swivel plate 566. The upper flange 552 attaches to the base plate 120 through a clamp slot 570.

OPERATION

First Embodiment—FIGS. 1, 2, 3, 4, 5, and 6

The theory of operation of this tool for opening a coconut will now be described. Firstly, it should be understood that the prior art for opening a coconut involves either cutting or smashing the nut with a blade, hammer etc. This invention uses the application of concentrated, constant pressure to the constrained coconut. In effect, the coconut is held in a vice like manner between the urging splitter and the constraining base plate. This has two advantageous effects. Firstly, the greater the pressure, the less opportunity the coconut has of escaping from the constrictor cup 124 in the base plate 120. Secondly, the act of applying concentrated pressure on the constrained coconut causes the nut to crack, or split.

The operation of the piercing and splitting tool will now be described. Firstly, before opening a coconut the prized water needs to be drained off. To achieve this, start by loading the tap assembly 300 in to the bottom of the drive assembly 200. To secure the tap assembly 300, squeeze in the two lugs 320 on the barrel 310 and allow them to pop into the two apertures 240 on the shaft 210. Place the coconut vertically in the body 100, resting it in the constrictor cup 124 with the coconut's three eyes uppermost. Slowly turn the handle 220 until the sharp edge 350 of the tap assembly 300 has aligned with, and started to cut into, one of the eyes. Slide the shield 500 into the channels 180 and secure to the frame 110 with the latches 510. Use one hand to steady the tool using the grip 170 and the other hand to turn the handle 220 until the tap has cut through the eye of the nut. The operator will feel this when there is less resistance to the handle 220. The operator can now elect to bore out a second eye using the same method of operation. This will help the flow of water but is not essential. Remove the shield 500 and withdraw the tap assembly 300 by turning the handle 220 counterclockwise until the barrel 310 is clear of the coconut. Lift the coconut off the base plate 120 and pour the water into a collecting vessel.

Remove the tap assembly 300 by squeezing in the two lugs 320 to clear the securing apertures 240 then slide off the shaft 210. Now load the splitter assembly 400 in to the bottom of the drive assembly 200. To secure the splitter assembly 400, squeeze the two lugs 320 on the shank 410 in and allow them to pop out into the securing apertures 240 on the shaft 210. Place the coconut horizontally on the constrictor cup 124 allowing it to sit snug in the depression formed by the fossae 125. Find one of the seams that start between the eyes of the coconut and runs down through the equator of the nut. Rotate the coconut until this seam is sitting directly below the concave blade 470 of the chisel 420. Slowly turn the handle 220 until the concave blade 470 is just starting to exert pressure into the seam of the coconut. Slide the shield 500 into the channels 180 and secure to the frame 110 with the latches 510. Use one hand to steady the tool using the grip 170 and the other hand to slowly turn the handle 220 urging the chisel in to the coconut. The goal here is not to drive the concave blade 470 all the way through the coconut but to produce enough pressure on the nut to cause it to split cleanly in half. After a few turns, if the nut has not split, leave the nut under pressure for a short while. Then turn the handle 220 counterclockwise until there is enough room to rotate the coconut 180 degrees. Oftentimes, the releasing of this force on the nut causes it to split. If not, repeat the steps necessary to urge the chisel 420 back into the opposite side of the coconut. Depending on the maturity of the coconut, and therefore its hardness, the nut should split easily. For tougher nuts just repeat the last two steps until it yields and splits. Remove the shield 500 and withdraw the splitter assembly 400 by turning the handle 220 counterclockwise until the concave blade 470 is clear of coconut. The coconut is now split and its meat accessible.

DESCRIPTION

Figure 7:
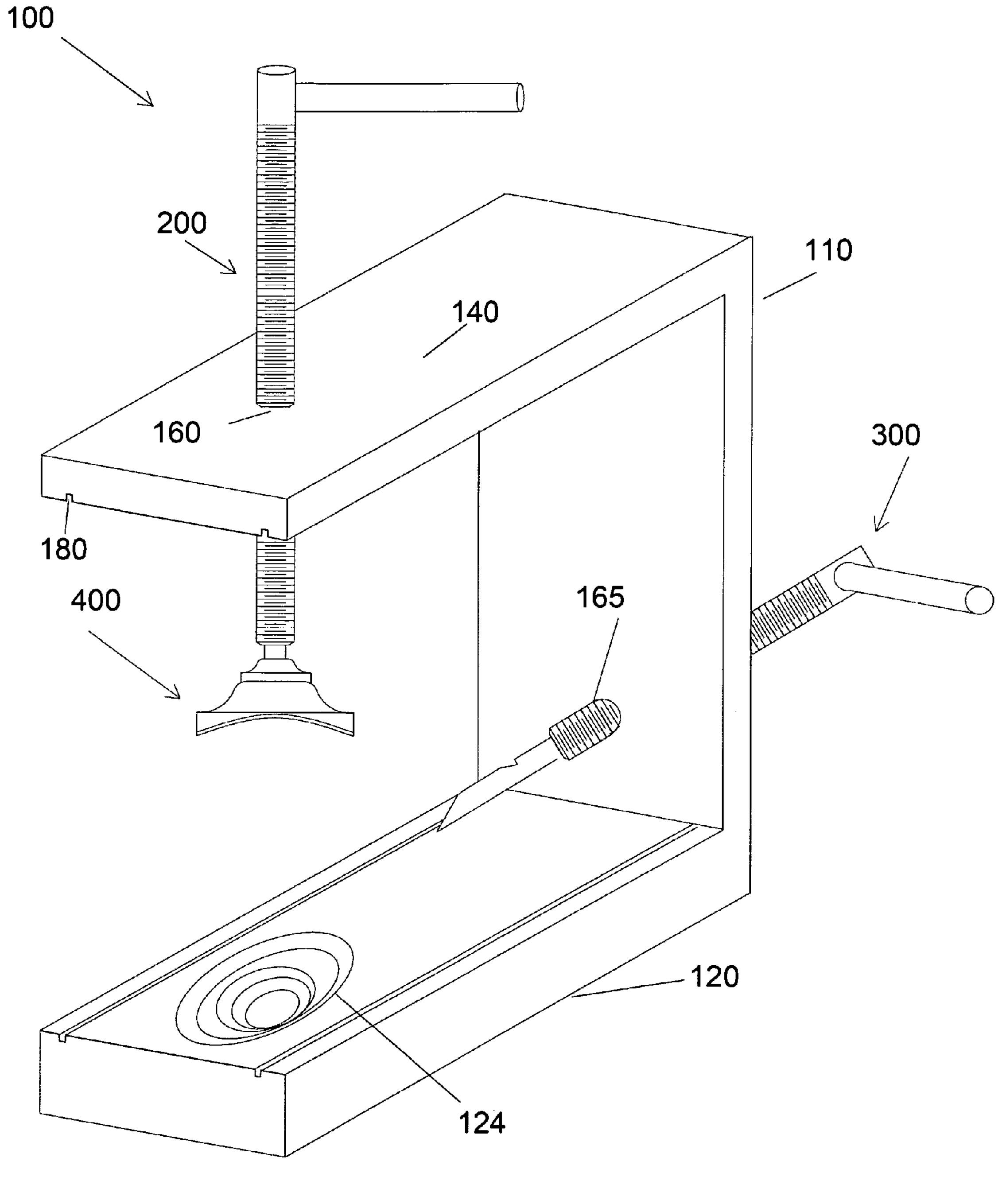
FIG. 7 is a perspective view of a second embodiment.
Figure 8A:
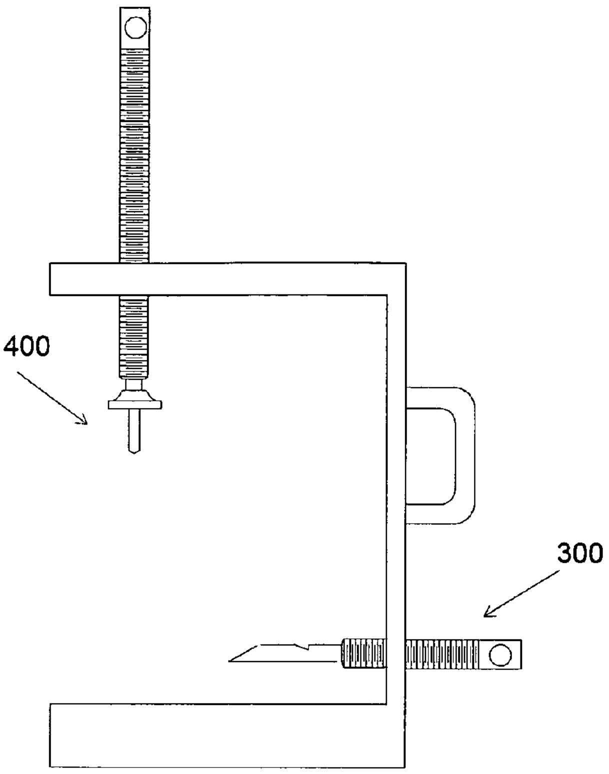
FIGS. 8A to 8D shows various aspects of the second embodiment.
Figure 8B:
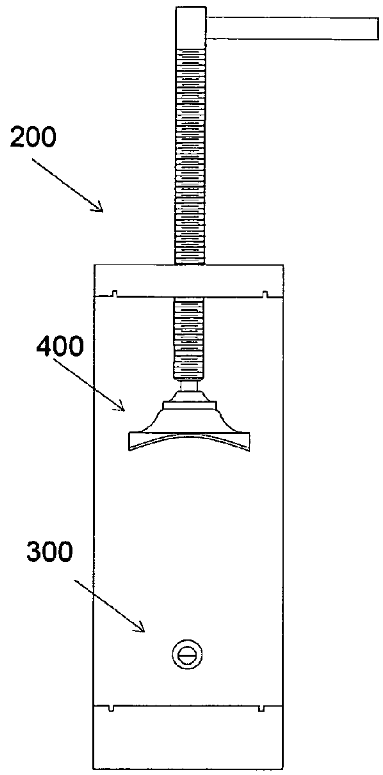
Figure 8C:
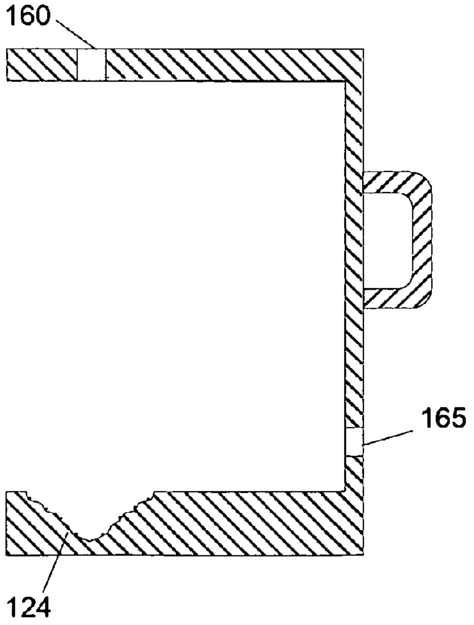
Figure 8D:
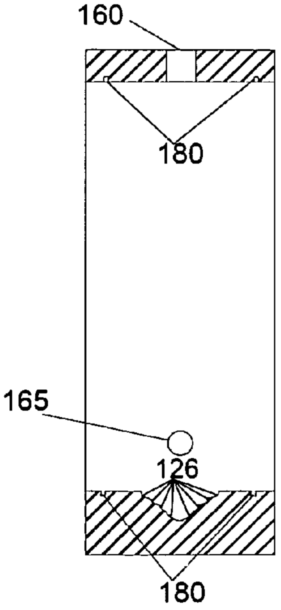

Alternative Embodiment—FIGS. 7 and 8

The difference between this embodiment and the first one is that instead of the tap assembly 300 and the splitter assembly 400 being interchangeable, both are incorporated in the frame 110 at the same time. This is accomplished by the inclusion of a frame aperture 165 in the frame 110 located to be approximately in line with the central axis of a coconut placed horizontally on the constrictor cup 124. The tap assembly 300 with its drive assembly 200 is then threaded into the frame aperture 165. The splitter assembly with its drive assembly 200 is then threaded into the hub aperture 160. The frame 110 would be adjusted in size to accommodate this alternative embodiment.

OPERATION

Alternative Embodiment—FIGS. 7 and 8

In this embodiment the coconut is placed horizontally in the body 100, resting it in the constrictor cup 124 with the coconuts three eyes facing the frame aperture 165. Lower the splitter assembly 400 until it locks the coconut into the constrictor cup but do not over tighten. Slowly turn the handle 220 of the tap assembly 300 until the sharp edge 350 has aligned with, and started to cut into, one of the eyes. Slide the shield 500 into the channels 180 and secure to the frame 110 with the latches 510. Use one hand to steady the tool using the grip 170 and the other hand to turn the handle 220 until the tap has cut through the eye of the nut. The operator will feel this when there is less resistance to the handle 220. The operator can now elect to bore out a second eye using the same method of operation. This will help the flow of water but is not essential. Remove the shield 500 and withdraw the tap assembly 300 by turning the handle 220 counterclockwise until the barrel 310 is clear of the coconut. Release the splitter assembly 400 by turning its drive assembly counter clockwise. Lift the coconut off the base plate 120 and pour the water into a collecting vessel.

Place the coconut back horizontally again on the constrictor cup 124 allowing it to sit snug in the depression formed by the fossae 125. Find one of the seams that start between the eyes of the coconut and runs down through the equator of the nut. Rotate the coconut until this seam is sitting directly below the concave blade 470 of the chisel 420. Slowly turn the handle 220 until the concave blade 470 is just starting to exert pressure into the seam of the coconut. Slide the shield 500 into the channels 180 and secure to the frame 110 with the latches 510. Use one hand to steady the tool using the grip 170 and the other hand to slowly turn the handle 220 urging the chisel in to the coconut. The goal here is not to drive the concave blade 470 all the way through the coconut but to produce enough pressure on the nut to cause it to split cleanly in half. After a few turns, if the nut has not split, then leave the nut under pressure for a short while. Then turn the handle 220 counterclockwise until there is enough room to rotate the coconut 180 degrees. Repeat the steps necessary to urge the chisel 420 back into the opposite side of the coconut. Depending on the maturity of the coconut, and therefore its hardness, the nut should split easily. For tougher nuts just repeat the last two steps until it yields and splits. Remove the shield 500 and withdraw the splitter assembly 400 by turning the handle 220 counterclockwise until the concave blade 470 is clear of the coconut. The coconut is now split and its meat accessible.

There can be alternative urging means to both of these embodiments. One such urging means is the use of a gearing. An example of this is a gearing assembly 700 being attached to the shaft 210. FIGS. 10A-10D shows said gear assembly 700 consisting of a spur gear 710, a worm or screw pinion 720 and a lever mechanism 730. Other alternative urging means include, but are not limited to: a rack and pinion force on the shaft, similar to the "rabbit" style cork screw; a force from a lever arm onto the shaft; an electric motor; etc.

DESCRIPTION

Figure 9:
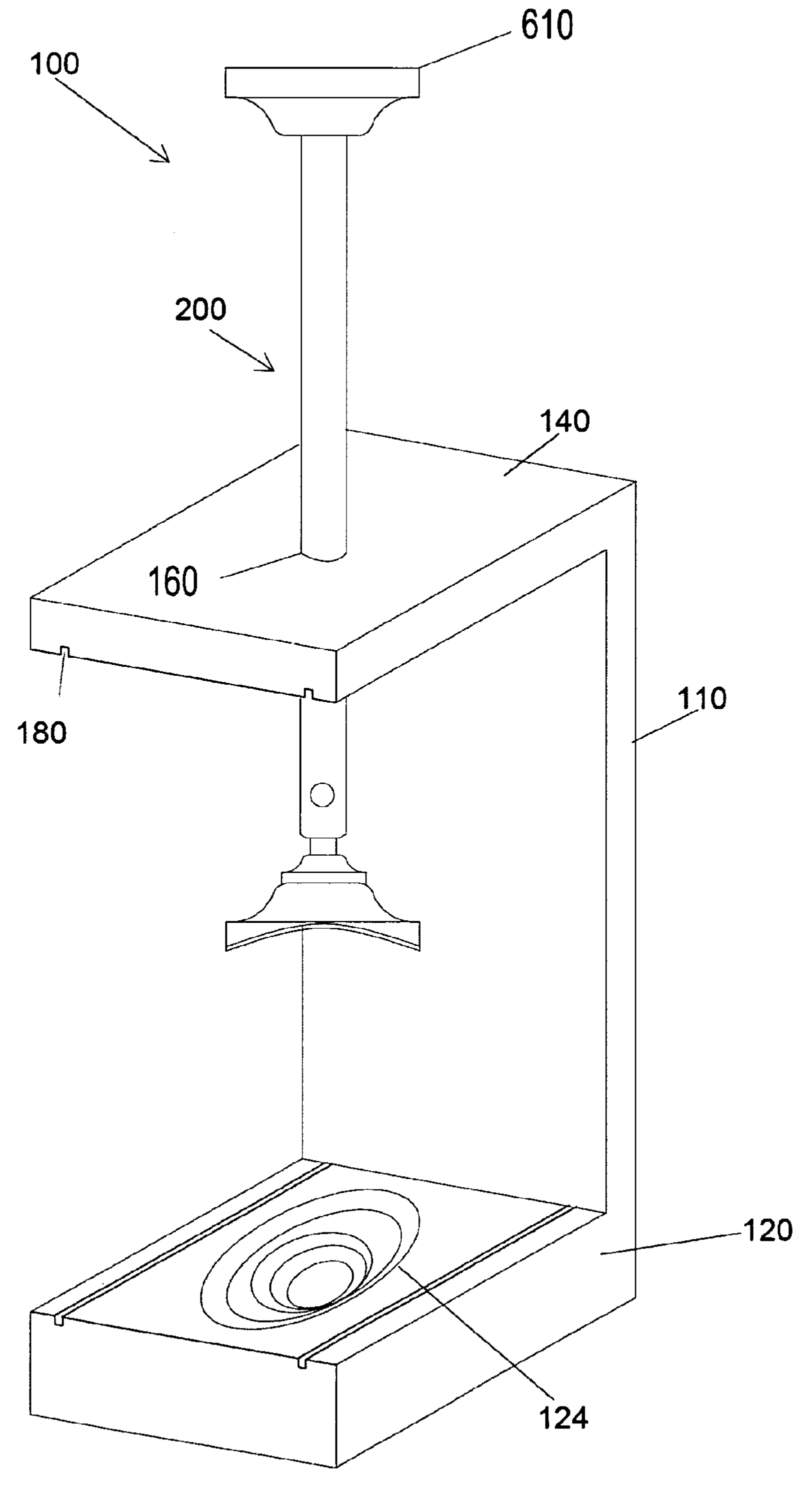
FIG. 9 is a perspective view of a third embodiment.
Figure 10A:
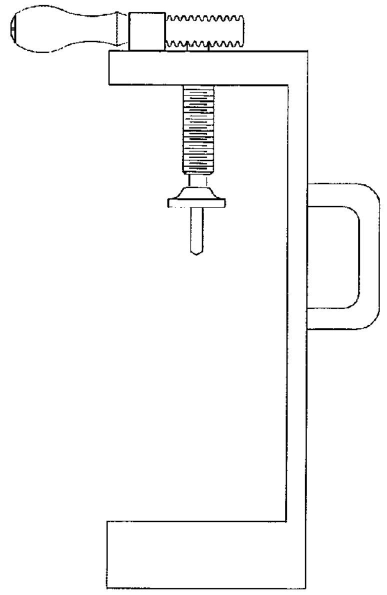
FIGS. 10A to 10D shows various aspects of a gearing assembly.
Figure 10B:
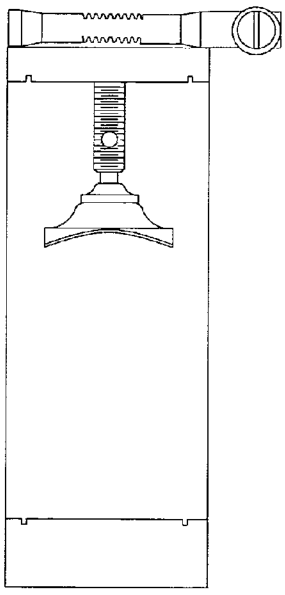
Figure 10C:
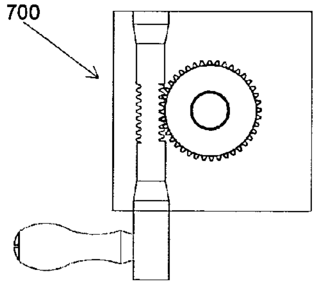
Figure 10D:
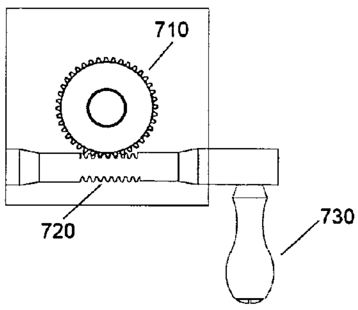

Alternative Embodiment—FIG. 9

This embodiment is a variation on the first embodiment. The shaft 210 is not threaded. Aperture 160 in the hub 140 is not threaded either. At the top of the shaft 210 there is no handle 220. Instead the shaft has a flared head 610.

OPERATION

Alternative Embodiment—FIG. 9

In this embodiment the operation is the same as in the first embodiment with one exception. Instead of driving the shaft 210 into the coconut by rotating the handle 220, the shaft is urged down by applying a force, with a hammer or similar tool, to the flared head 610.

Advantages

From the description above, a number of advantages of some embodiments from my tool to pierce and split a coconut become evident:

a) The need to use dangerous tools like an ice pick, awl etc. to pierce the eyes of an unrestrained coconut has been eliminated. The only sharp point, or edge, is contained within the shield 500. Furthermore, the recessed base plate keeps the coconut from moving away from the piercing tool. This should help avoid personal injury and damage to property.

b) The need to use a dangerous tool like a machete, cleaver, cutlass, hatchet, knife etc. to open an unrestrained coconut has been eliminated. The only sharp edge is contained within the shield 500. Furthermore, the recessed base plate keeps the coconut from moving away from the splitting/cutting edge. This should help avoid personal injury and damage to property.

c) Because this is designed as a tool for the kitchen, made from materials that can easily be cleaned this is a much more hygienic way of opening a coconut. The options used to date often included tools from the garage, or workshop, and also could involved placing the coconut on the floor in order to be able to hit it with a dangerous instrument. Coconut water and meat will no longer be spilt on the floor.

d) As a result of the simplicity of this invention it can be made at a low cost making it affordable for most.

e) It is quite compact in size and will not take up much space when in use or when being stored.

f) Since this invention does not need electrical power this also keeps the manufacturing cost down and the size more compact.

CONCLUSION, RAMIFICATIONS, AND SCOPE

Accordingly the reader will see that at least one embodiment of my tool to pierce and split a coconut provides a safer, more hygienic, compact, yet economical device that can be used by most cooks.

While the above description contains much specificity, these should not be construed as limitations on the scope of any embodiment, but as exemplifications of the presently preferred embodiments thereof. Many other ramifications and variations are possible within the teachings of the various embodiments. For example, the frame could be square, oval, "G" shaped etc and could be modular or in sections rather than integral. As indicated earlier it could be made from any material that can take the pressures involved and can be kept hygienic. In any of the embodiments, the frame 110 could be made adjustable to accommodate different sized coconuts. Furthermore, on this point of size, this tool can be constructed to accommodate a coconut in its husk. The same functions of piercing and splitting can be performed through the husk as well as the nut.

Thus the scope of the invention should be determined by the appended claims and their legal equivalents, and not by the examples given.

I claim:

1. A method for opening a coconut to facilitate the removal of water and meat from said coconut comprising:

a) providing a tool comprising a body comprising a frame sufficient in size to accommodate a coconut, a constraining mechanism for stabilizing said coconut, and
a shaft, and
a cutting end to said shaft, and
a splitting end to said shaft, and
the frame having an aperture for said shaft to pass through, and
in combination with said frame, said shaft having urging means to apply force to said cutting and said splitting ends, b) inserting a coconut into said constraining mechanism with coconut eyes in alignment with said shaft engaging said cutting end into said shaft, c) urging said cutting end into a coconut eye until the cutting end pierces a hole, d) draining water through the pierced hole, e) releasing said cutting end and engaging said splitting end in said shaft, f) placing the coconut in said constraining mechanism with a seam aligned with said splitting end wherein the splitting end has a concave blade which approximates the curvature of the coconut, g) urging said splitting end into the seam of the coconut until enough pressure has been applied to cause the coconut to split, h) whereby a person can pierce and split a constrained coconut safely and thereby gain access to the water and meat of said coconut.

2. The method of claim 1 wherein said frame aperture of said tool has a thread and wherein the urging means includes a handle and said shaft has a thread which is threadedly mated with the thread of said frame aperture.

3. The method of claim 1 wherein said cutting end has means to be releasably engaged to said shaft.

4. The method of claim 1 wherein said splitting end has means to be releasahly engaged to said shaft.

5. The method of claim 1 wherein said splitting end is pivotal.

6. The method of claim 1 wherein said body includes means to attach a shield.

7. The method of claim 1 wherein said body includes means to secure it during operation to a work surface.

8. The method of claim 1 wherein the urging means is a rack & pinion force on said shaft.

9. The method of claim 1 wherein urging means is a lever arm.

10. The method of claim 1 wherein said tool comprises:

a) said frame aperture has a thread and wherein the urging means includes a handle and said shaft has a thread which is threadedly mated with the thread of said frame aperture, and b) said body includes means to attach a shield, and c) said body includes means to secure it during operation to a work surface, and d) said cutting end has means to be releasably engaged to said shaft, and e) said splittind end has means to be releasably engaged to said shaft and f) said splitting end is pivotal.

11. A method for opening a coconut to facilitate the removal of water and meat from said coconut comprising:

a) providing a tool comprising a body comprising a frame sufficient in size to accommodate a cocomut, a constraining mechanism for stabilizing said coconut, and first and second shafts, and
a cutting end attached to said first shafts, and
a splitting end attached to said second shaft, and
said frame having apertures for each of the said shafts to pass through, and
in combination with said frame, said first and second shafts each having urging means to apply force to said cutting and said splitting ends, b) inserting coconut into said constraining mechanism with coconut eyes in alignment with said first shaft with cutting end wherein the splitting end holds the coconut in place against the constraining mechanism, c) urging said cutting end into coconut eye until the cutting end pierces a hole, d) drain water through the pierced hole, e) placing the coconut in said constraining mechanism with a seam in alignment with said second shaft with splitting end, f) urging said splitting end into side of the seam of the coconut until enough pressure has been applied to cause the coconut to split, whereby a person can pierce and split a constrained coconut safely and thereby gain access to the water and meat of said coconut.

12. The method of claim 11 wherein said frame apertures of said tool each have a thread and wherein the urging means for each of said first and second shafts include a handle and a shaft thread which is threadedly mated with the thread of the respective frame aperture.

13. The method of claim 11 wherein said cutting end has means to be releasably engaged to, said first shaft.

14. The method of claim 11 wherein said splitting end has means to be releasably engaged to said second shaft.

15. The method of claim 11 wherein said splitting end is pivotal.

16. The method of claim 11 wherein said body includes meands to secure it during operation tp a work surface.

17. The method of claim 11 wherein said body includes means to attach a shield.

18. The method of claim 11 wherein urgind means is a rack & pinion force on each of said first and second shafts.

19. The method of claim 11 wherein urging means is a lever arm each of said first and second shafts.

20. The method of claim 11 wherein said tool comprises:

a) said frame apertures each have a thread and wherein the urging means for each of said first and second shafts include a handle and a shaft thread which is threadedly mated with the thread of the respective frame aperture, and b) said body includes means to attach a shield, and c) said body includes means to secure it during operation to a work surface, and d) said cutting end has means to be releasably engaged to said first shaft, and e) said splitting end has means to be releasably engaged to said second shaft, and f) said splitting end is pivotal.

* * * * *